US008625182B2

(12) United States Patent
Cable

(10) Patent No.: US 8,625,182 B2
(45) Date of Patent: Jan. 7, 2014

(54) HOLOGRAPHIC IMAGE DISPLAY SYSTEMS

(75) Inventor: Adrian James Cable, Harlton (GB)

(73) Assignee: Light Blue Optics Ltd., Cambridge, Cambridgeshire (GB)

( * ) Notice: Subject to any disclaimer, the term of this patent is extended or adjusted under 35 U.S.C. 154(b) by 477 days.

(21) Appl. No.: 12/747,151

(22) PCT Filed: Nov. 28, 2008

(86) PCT No.: PCT/GB2008/051129
§ 371 (c)(1),
(2), (4) Date: Dec. 14, 2010

(87) PCT Pub. No.: WO2009/074819
PCT Pub. Date: Jun. 18, 2009

(65) Prior Publication Data
US 2011/0109948 A1    May 12, 2011

(30) Foreign Application Priority Data

Dec. 11, 2007    (GB) .................................. 0724161.5

(51) Int. Cl.
*G03H 1/08* (2006.01)
(52) U.S. Cl.
USPC ............................................................ 359/9
(58) Field of Classification Search
USPC ...................................................... 359/1–35
See application file for complete search history.

(56) References Cited

U.S. PATENT DOCUMENTS

| | | | | |
|---|---|---|---|---|
| 6,760,135 | B1 * | 7/2004 | Payne et al. ..................... | 359/15 |
| 2005/0286101 | A1 | 12/2005 | Garner et al. | |
| 2010/0172001 | A1 * | 7/2010 | Johnson ............................ | 359/9 |

FOREIGN PATENT DOCUMENTS

| | | |
|---|---|---|
| JP | 09-197947 | 7/1997 |
| JP | 2006-212698 | 8/2006 |
| WO | WO 2005/059881 | 6/2005 |
| WO | WO 2007/031797 | 3/2007 |

OTHER PUBLICATIONS

Machine translation of Seo et al. (JP 2006-212698 A1).*
Hauck, et al. "Computer-generated Holograms with Pulse-density Modulation," *Journal of the Optical Society of America A*, vol. 1, No. 1, pp. 5-10, Jan. 1984.
International Search Report dated Dec. 15, 2009 and issued to international application No. PCT/GB2008/051129.
Search Report for GB 0724161.5, dated Apr. 7, 2008.

* cited by examiner

*Primary Examiner* — Stephone B. Allen
*Assistant Examiner* — Kimberly N Kakalec
(74) *Attorney, Agent, or Firm* — Knobbe, Martens, Olson & Bear, LLP

(57) ABSTRACT

This invention relates to methods, apparatus, and computer program code for the holographic display of images. We describe a method of displaying an image holographically. The method includes displaying a hologram on pixels of a spatial light modulator (SLM) and illuminating the SLM such that the image is displayed in pixels of a replay field (RPF) of the hologram. The method further includes subdividing the replay field into a plurality of spatially interlaced regions, and displaying holograms for each of the interlaced regions of the replay field sequentially at different times such that in an observer's eye the interlaced regions integrate to give the impression of the image and such that interference between adjacent pixels of the replay field is reduced.

16 Claims, 7 Drawing Sheets

HOLOGRAPHIC IMAGE DISPLAY SYSTEMS

CROSS-REFERENCE TO RELATED APPLICATIONS

This application is the U.S. National Phase under 35 U.S.C. §371 of International Application No. PCT/GB2008/051129, filed Nov. 28, 2008, designating the United States and published in English on Jun. 18, 2009, as WO 2009/074819, which claims priority to United Kingdom Application No. 0724161.5, filed Dec. 11, 2007.

FIELD OF THE INVENTION

This invention relates to methods, apparatus, and computer program code for the holographic display of images.

BACKGROUND TO THE INVENTION

We have previously described techniques for displaying an image holographically (see, for example, WO 2005/059660, WO 2006/134398, WO 2006/134404, WO 2007/031797, WO 2007/085874, and WO 2007/110668, all hereby incorporated by reference in their entirety). They have a range of applications including, for example, in hand held battery powered devices such as digital cameras, mobile phones, portable media players, laptop computers and the like.

Broadly speaking in this technique an image is displayed by displaying a plurality of holograms each of which spatially overlaps in the replay field and each of which, when viewed individually, would appear relatively noisy because noise is added (by phase modulation) prior to a holographic transform of the image data. However when viewed in rapid succession the replay field images average together in the eye of a viewer to give the impression of a reduced (low) noise image. The noise in successive temporal subframes may either be pseudo-random (substantially independent) or the noise in a subframe may be dependent on the noise in one or more earlier subframes with the aim of at least partially cancelling this out, or a combination of both may be employed. More details of such OSPR (One Step Phase Retrieval)-type procedures and the associated ADOSPR (adaptive OSPR) are described later.

The conventional ADOSPR approach functions by sequentially considering whole colour planes of the input image, which (subsequent to appropriate pre-processing) are embedded in a frame of suitable size (e.g. 1024×1024 pixels), from which a number of hologram subframes are produced. Each hologram subframe is the same resolution as the frame, and its computation necessitates a Fourier transform of that size. Due to the nature of the implementation of the fast Fourier transform operation in hardware, a large, fast memory is required to store the fully-complex intermediate data produced. The memory bandwidth required makes an off-chip implementation difficult, while the memory size required would make an on-chip implementation uneconomical.

Additionally, while holograms produced in this manner may exhibit good performance in simulation, in reality the images produced will exhibit the phenomenon of inter-pixel interference, compromising the uniformity and readability of images. Such a phenomenon results from optical system aberrations resulting from non-flatnesses in the SLM surface and lenses: such aberrations cause the system's point spread function (PSF) to increase in spatial extent, with the result that spots from adjacent pixels now overlap. Because the spots are coherent, they interfere with each other, and because the associated target pixels have random phase, the interference consists of random regions of constructive and destructive interference which appear as blotchiness in the output. (This effect is referred to by some authors as "speckle". However, the effect has nothing whatsoever to do with the phenomenon of laser speckle, in the usual sense of the term, which results from interference of coherent light on the eye's retina, subsequent to scattering from a rough surface.) The approach described in the applicant's pending application GB 0706264.9 published as GB 2448132 (incorporated herein by reference) corrects for inter-pixel interference by taking the system's PSF into account, but if the PSF is not known exactly, as is the case when non-systematic non-flatnesses are present in the system, its efficacy is significantly reduced.

A two-dimensional encoding method for hologram recording is described in JP09197947.

SUMMARY OF THE INVENTION

According to a first aspect of the invention there is provided a method of displaying an image holographically, the method comprising displaying a hologram on pixels of a spatial light modulator (SLM) and illuminating said SLM such that said image is displayed in pixels of a replay field (RPF) of said hologram, and wherein the method further comprises subdividing said replay field into a plurality of spatially interlaced regions, and displaying holograms for each of said interlaced regions of said replay field sequentially at different times such that in an observer's eye said interlaced regions integrate to give the impression of said image and such that interference between adjacent pixels of said replay field is reduced.

Each said interlaced region may comprise a set of pixels of said replay field in which each pixel is surrounded by pixels of substantially zero light intensity. Said set of pixels may be arranged in a regular grid having spaces in between, said grids of different said interlaced regions being spatially displaced with respect to one another such that pixels of one said grid are located in said spaces of another said grid.

Since multiple interlaced regions are formed to represent each whole input image instead of one replay field, the frame rate to the display needs to be increased by the number of interlaced regions to maintain an equivalent pixel uniformity. Accordingly, the method may further comprise calculating a hologram to display a said interlaced region of said replay field by calculating a subfield hologram to display pixels in said replay field at a reduced resolution and wherein said hologram displaying comprises displaying a plurality of substantial replicas of said subfield hologram simultaneously on said SLM. Said substantial replicas may comprise substantially the same data or inverted data as the subfield hologram. Said reduced resolution may be reduced in proportion to a number of said spatially interlaced regions employed and the plurality of substantial replicas of said subfield hologram may be in proportion to the number of said spatially interlaced regions employed.

Four said interlaced regions may be employed each having a pixel spacing of twice a spacing of said pixels in said replay field. The interlaced regions may be defined by defining orthogonal axes (e.g. x and y axes) in the replay field and dividing said replay field such that a first interlaced region contains the pixels with even x and even y coordinates with surrounding zeros, a second interlaced region contains the image pixels with odd x and even y coordinates with surrounding zeros, a third interlaced region contains the image pixels with even x and odd y coordinates with surrounding zeros, and a fourth interlaced region contains the image pixels with odd x and odd y coordinates with surrounding zeros. Subfield holograms for said interlaced regions may be calculated by disregarding the zero pixels.

Holograms for said interlaced regions may be displayed on said SLM with, respectively, phases to provide lateral displacement in said replay field of: substantially zero pixels, one pixel horizontally, one pixel vertically, and one pixel both horizontally and vertically. Said calculating of a said hologram may comprise applying phase shift to provide said lateral displacement.

Multiple holograms may be used for each spatially interlaced region, for example using an OSPR-type procedure to generate multiple temporal subframes for each interlaced region.

Optionally an OSPR procedure with feedback may be employed for improved results. However the technique is not restricted to holograms calculated using an OSPR-type procedure and, in general, any type of procedure may be employed to calculate one or more holograms displaying each interlaced region.

According to another aspect of the invention, there is provided a holographic image display system, the system comprising:
  a substantially coherent light source;
  a display SLM to modulate light from said light source with a hologram;
  display optics to form an image from said hologram, said display optics having an intermediate image position at which an image of a replay field of said hologram is formed;
  a system for dividing said replay field into a plurality of spatially interlaced regions and for calculating hologram data for each of said spatially interlaced regions,
  wherein said SLM is configured to display holograms for each of said interlaced regions of said replay field sequentially at different times such that in an observer's eye said interlaced regions integrate to give the impression of said image and such that interference between adjacent pixels of said replay field is reduced.

If there are four interlaced regions, previously 25 frames/sec video using 24 sub-frames per frame (by implementing the OSPR method), would require a display frame rate of 600 frames/sec, whereas now the required rate quadruples to 2400 frames/sec. Accordingly, the holographic image display system may be configured to calculate a subfield hologram to display pixels in said replay field at a reduced resolution with said hologram to be displayed comprising a plurality of substantial replicas of said subfield hologram. Said system may transmit said subfield holograms to said SLM and said SLM may be configured to construct said hologram to be displayed from said subfield holograms. In this way, the same bandwidth may be retained between the system and the SLM.

According to another aspect of the invention, there is provided a display spatial light modulator (SLM) to modulate light from a light source with a hologram, said SLM comprising an input to receive a subfield hologram, and a system to construct said hologram from a plurality of substantial replicas of said received subfield holograms. In other words, the display may be configured to internally generate the hologram from the subfield holograms. Thus, although four times the number of sub-frames are used, each sub-frame is represented by data of only a quarter the size.

The display SLM may comprise a select line to select a tile in said hologram for writing said subfield hologram and an invert pin which is adjustable to write a normal or inverted subfield hologram for each selected tile.

According to another aspect of the invention, there is provided a data processing system for generating hologram data to be displayed on a holographic image display system, said data processing system comprising
  an input to receive an image of a replay field of a hologram;
  a processor configured to divide said replay field into a plurality of spatially interlaced regions and to calculate hologram data for each of said spatially interlaced regions; and
  an output to transmit said calculated hologram data to a spatial light modulator such that when said hologram data is displayed on said spatial light modulator sequentially at different times said interlaced regions integrate to give the impression of an image from said hologram and interference between adjacent pixels of said replay field is reduced.

The invention further provides processor control code to implement the above-described systems and methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

Embodiments of the above described methods and systems may be incorporated into a consumer electronics device, or into an advertising or signage system, or into a helmet mounted or head-up display or, for example, an aircraft or automobile.

BRIEF DESCRIPTION OF THE DRAWINGS

These and other aspects of the invention will now be further described, by way of example only, with reference to the accompanying figures in which:

FIGS. 3a and 3b show, respectively, a block diagram of an OSPR hologram data calculation system, and operations performed within the system of FIG. 3a;

DETAILED DESCRIPTION OF PREFERRED EMBODIMENTS

Figure 1:
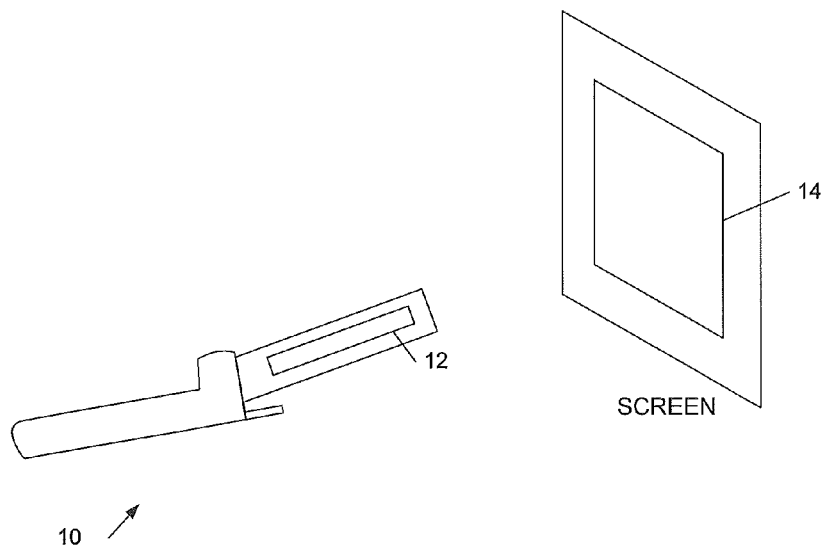
FIG. 1 shows an example of a consumer electronic device incorporating a holographic projection module.

FIG. 1 shows an example a consumer electronic device 10 incorporating a holographic image projection module 12 to project a displayed image 14. Displayed image 14 comprises a plurality of holographically generated sub-images each of the same spatial extent as displayed image 14, and displayed rapidly in succession so as to give the appearance of the displayed image. Each holographic sub-frame is generated using an OSPR-type procedure. Details of an example procedure are given later, but the skilled person will understand that the schemes for increasing efficiency we describe later are not limited to any particular method for calculating a hologram for display on an SLM in order to reproduce an image (which here includes a frame of a video), albeit that employing an OSPR-type procedure is advantageous.

Figure 2:
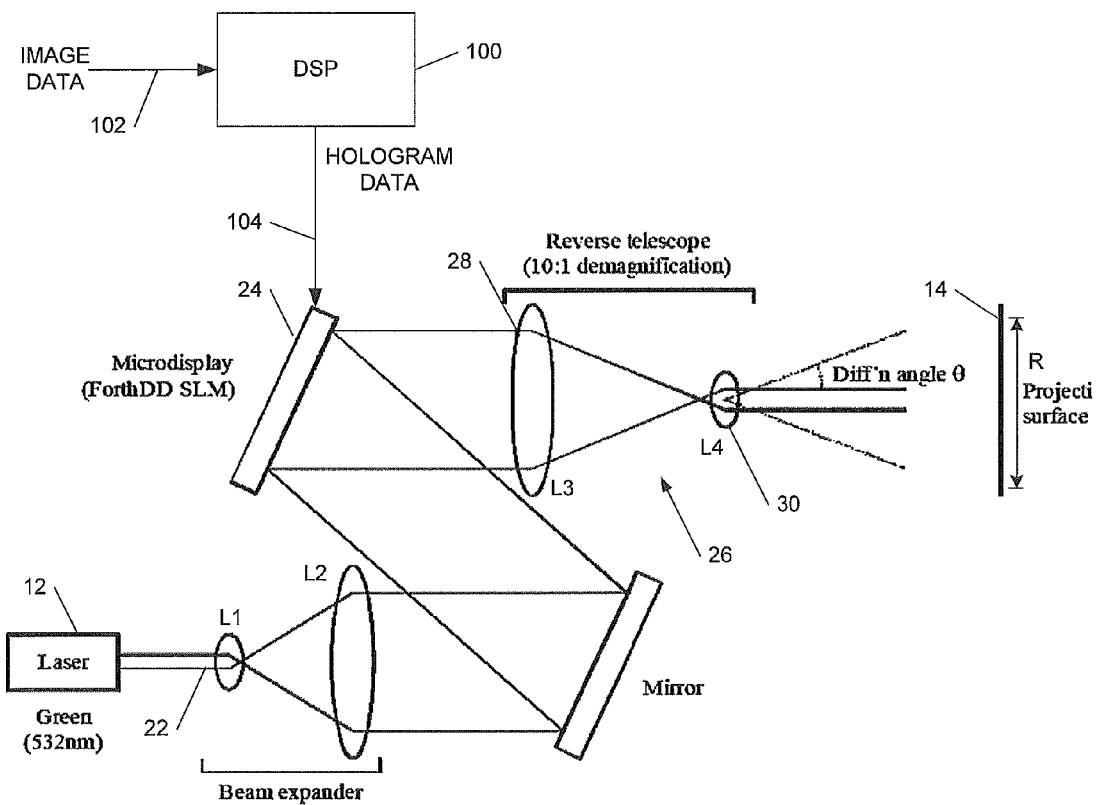
FIG. 2 shows an example of an optical system for the holographic projection module of FIG. 1, and lens sharing arrangements used with a reflective SLM.

FIG. 2 shows an example optical system for the holographic projection module of FIG. 1. Referring to FIG. 2, a laser diode 20 (for example, at 532 nm), provides substantially collimated light 22 via a mirror 23 to a spatial light modulator (SLM) 24 such as a pixellated liquid crystal modulator. (As illustrated, the SLM is a reflective SLM but a transmissive SLM may also be employed). The SLM 24 phase modulates light 22 with a hologram and the phase modulated light is preferably provided to a demagnifying optical system 26. In the illustrated embodiment, optical system 26 comprises a pair of lenses (L3, L4) 28, 30 with respective focal lengths $f_3$, $f_4$, $f_4 < f_3$, spaced apart at distance $f_3 + f_4$. Optical system 26 increases the size of the projected holographic image (replay field R) by diverging the light forming the displayed image; it effectively reduces the pixel size of the modulator, thus increasing the diffraction angle. Lenses $L_1$ and $L_2$ form a beam-expansion pair which expands the beam from the light source so that it covers the whole surface of the modulator; depending on the relative size of the beam 22 and SLM 24 this may be omitted. A spatial filter may be included to attenuate unwanted parts of the displayed image, for example a zero order undiffracted spot or a repeated first order (conjugate) image, which may appear as an upside down version of the displayed image, depending upon how the hologram for displaying the image is generated. However, for spatial filtering to be practical it is desirable that there is some spatial separation in the replay field between the displayed image and the portion of the replay field to be attenuated.

An example of a suitable binary phase SLM is the SXGA (1280×1024) reflective binary phase modulating ferroelectric liquid crystal SLM made by CRL Opto (Forth Dimension Displays Limited, of Scotland, UK). A ferroelectric liquid crystal SLM is advantageous because of its fast switching time; binary phase devices are convenient but devices with three or more quantized phases (in the art, referred to as multiphase SLMs) may also be employed. Binary quantization results in a conjugate image whereas the use of more than binary phase suppresses the conjugate image (see WO 2005/059660).

Referring again to FIG. 2, a digital signal processor 100 has an input 102 to receive image data from the consumer electronic device defining the image to be displayed. The DSP 100 implements an OSPR-type procedure to generate phase hologram data for a plurality of holographic sub-frames which is provided from an output 104 of the DSP 100 to the SLM 24, optionally via a driver integrated circuit if needed. The DSP 100 drives SLM 24 to project a plurality of phase hologram sub-frames which combine to give the impression of displayed image 14 in the replay field (RPF). The DSP 100 may comprise dedicated hardware and/or Flash or other read-only memory storing processor control code to implement the hologram generation procedure.

It is first helpful, for understanding embodiments of the invention, to review the OSPR procedure. Although we refer to this procedure in a shorthand way as One Step Phase Retrieval (OSPR) strictly speaking in implementations it could be considered that more than one step is employed—as described for example in WO2006/134404 and WO2007/085874, incorporated by reference, where "noise" in one sub-frame is compensated in a subsequent sub-frame—a form of OSPR with feedback. We term this latter technique ADOSPR (Adaptive OSPR).

OSPR

Broadly speaking in our preferred method the SLM is modulated with holographic data approximating a hologram of the image to be displayed. However this holographic data is chosen in a special way, the displayed image being made up of a plurality of temporal sub-frames, each generated by modulating the SLM with a respective sub-frame hologram. These sub-frames are displayed successively and sufficiently fast that in the eye of a (human) observer the sub-frames (each of which have the spatial extent of the displayed image) are integrated together to create the desired image for display.

Each of the sub-frame holograms may itself be relatively noisy, for example as a result of quantising the holographic data into two (binary) or more phases, but temporal averaging amongst the sub-frames reduces the perceived level of noise. Embodiments of such a system can provide visually high quality displays even though each sub-frame, were it to be viewed separately, would appear relatively noisy.

The procedure is a method of generating, for each still or video frame $I = I_{xy}$, sets of N binary-phase holograms $h^{(1)} \ldots h^{(N)}$. In embodiments such sets of holograms form replay fields that exhibit mutually independent additive noise. An example is shown below:

1. Let $G_{xy}^{(n)} = I_{xy} \exp(j\phi_{xy}^{(n)})$ where $\phi_{xy}^{(n)}$ is uniformly distributed between 0 and $2\pi$ for $1 \leq n \leq N/2$ and $1 \leq x, y \leq m$ 2. Let $$g_{uv}^{(n)} = F^{-1}[G_{xy}^{(n)}]$$

where $F^{-1}$ represents the two-dimensional inverse Fourier transform operator, for $1 \leq n \leq N/2$ 3. Let $$m_{uv}^{(n)} = \Re\{g_{uv}^{(n)}\}$$

for $1 \leq N \leq N/2$

4. Let $$m_{uv}^{(n|N/2)} = \Im\{g_{uv}^{(n)}\}$$

for $1 \leq n \leq N/2$

5. Let $$h_{uv}^{(n)} = \begin{cases} -1 & \text{if } m_{uv}^{(n)} < Q^{(n)} \\ 1 & \text{if } m_{uv}^{(n)} \geq Q^{(n)} \end{cases}$$

where $Q^{(n)} = \text{median}(m_{uv}^{(n)})$ and $1 \leq n \leq N$

Step 1 forms N targets $G_{xy}^{(n)}$ equal to the amplitude of the supplied intensity target $I_{xy}$, but with independent identically-distributed (i.i.t.), uniformly-random phase. Step 2 computes the N corresponding full complex Fourier transform holograms $g_{uv}^{(n)}$. Steps 3 and 4 compute the real part and imaginary part of the holograms, respectively. Binarisation of each of the real and imaginary parts of the holograms is then performed in step 5: thresholding around the median of $m_{uv}^{(n)}$ ensures equal numbers of −1 and 1 points are present in the holograms, achieving DC balance (by definition) and also minimal reconstruction error. The median value of $m_{uv}^{(n)}$ may be assumed to be zero with minimal effect on perceived image quality.

Figure 3A:
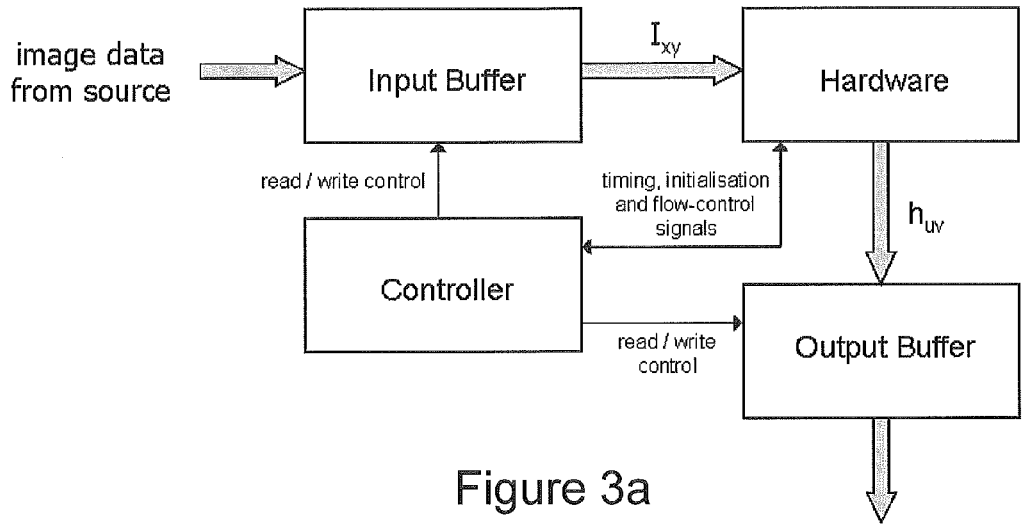

FIG. 3a shows a block diagram of a hologram data calculation system to implement this procedure. Input image data is temporarily stored in one or more input buffers, with control signals supplied from a controller. The input (and output) buffers preferably comprise dual-port memory such that data may be written into the buffer and read out from the buffer simultaneously. The control signals comprise timing, initialisation and flow-control information so that one or more holographic sub-frames are produced and sent to the SLM per video frame period. The output from the input buffer comprises an image frame, I, and this becomes the input to a hardware block (although in other embodiments some or all of the processing may be performed in software) which performs a series of operations on each of the image frames, I, and for each one produces one or more holographic sub-frames, h, which are sent to an output buffer and supplied from there to a display device such as a SLM, optionally via a driver chip.

Figure 3B:
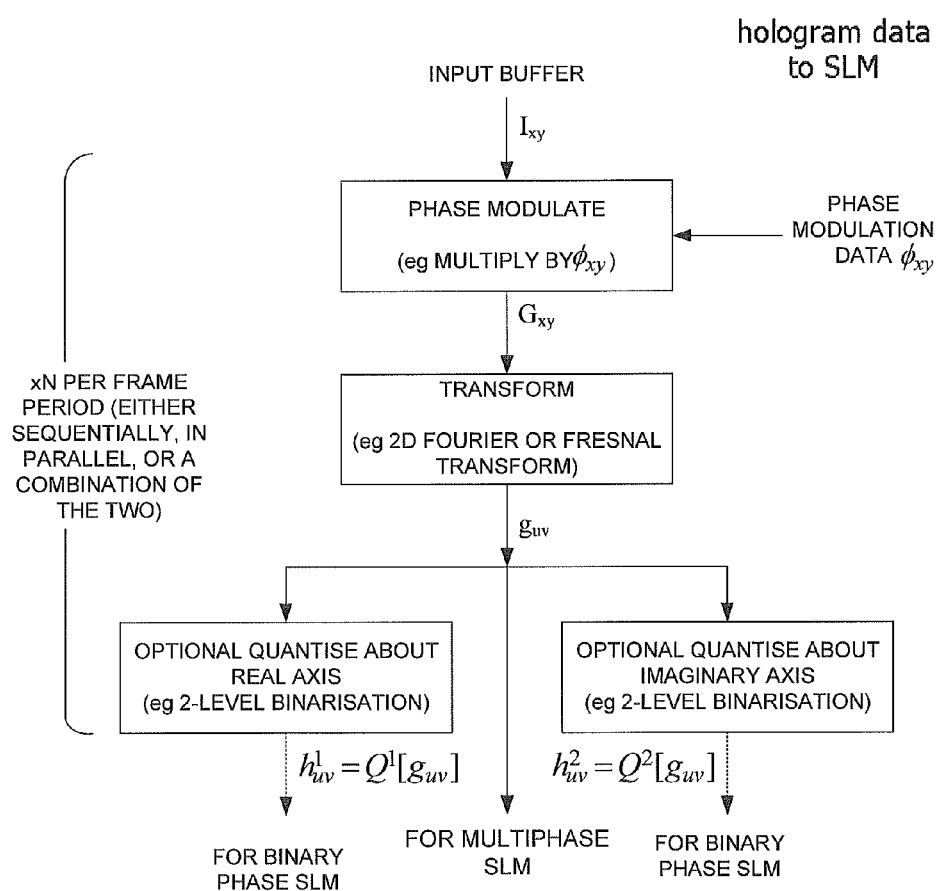

FIG. 3b shows details of the system of FIG. 3a, comprising a set of elements designed to generate one or more holographic sub-frames for each image frame. Preferably one image frame, $I_{xy}$, is supplied one or more times per video frame period as an input. Each image frame, $I_{xy}$, is then used to produce one or more holographic sub-frames by means of a set of operations comprising one or more of: a phase modulation stage, a space-frequency transformation stage and an optional quantisation stage. In embodiments, a set of N sub-frames, where N is greater than or equal to one, is generated per frame period by means of using either one sequential set of the aforementioned operations, or a several sets of such operations acting in parallel on different sub-frames, or a mixture of these two approaches. The phase-modulation stage redistributes the energy of the input frame more evenly throughout the spatial-frequency domain such that improvements in final image quality are obtained after performing later operations. An optional quantisation stage takes complex hologram data from the preceding space-frequency transform and maps it to a restricted set of values which correspond to actual modulation levels that can be achieved on a target, e.g. binary phase, SLM (real and imaginary components can be used, without ADOSPR—see below, to generate a pair of holographic sub-frames). In some preferred embodiments of the technique however a multiphase SLM is employed, in which case a separate quantisation stage is not needed. In this case a conjugate image is not formed.

In the OSPR approach we have described above subframe holograms are generated independently and thus exhibit independent noise. However the generation process for each subframe can take into account the noise generated by the previous subframes in order to cancel it out, effectively "feeding back" the perceived image formed after, say, n OSPR frames to stage n+1 of the procedure, forming a closed-loop system. Such an adaptive (AD) OSPR procedure uses feedback as follows: each stage n of the algorithm calculates the noise resulting from the previously generated holograms $H_1$ to $H_{n-1}$, and factors this noise into the generation of the hologram $H_n$ to cancel it out. As a result, noise variance falls as $1/N^2$ (where a target image T outputs a set of N holograms). More details can be found in WO2007/031797 and WO2007/085874.

New Approach

Figure 4:
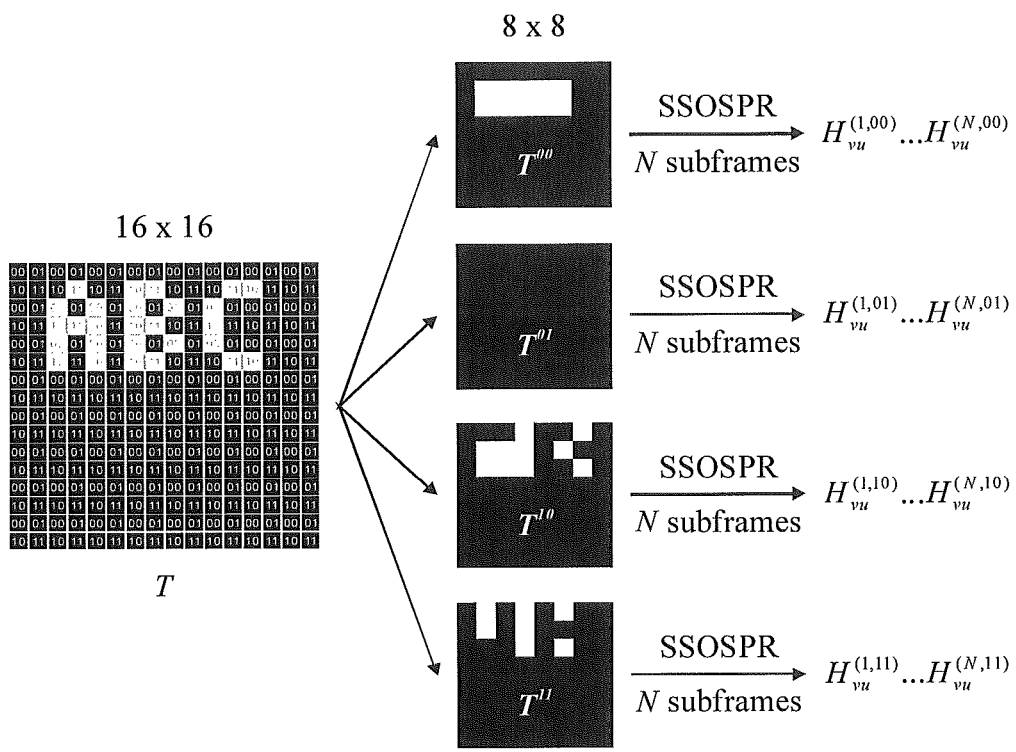
FIG. 4 shows a flow chart of the method according to an embodiment of the invention.

The new approach proceeds by dividing an M×M-pixel image T (or a single colour plane for a full-colour system) into multiple interlaced regions. FIG. 4 shows one method of dividing the image into four interlaced regions by defining x and y axes in the replay field. A first interlaced region contains the pixels with even x and even y coordinates, i.e. the pixels marked 00, surrounded by zeroes, a second interlaced region contains the image pixels with odd x and even y coordinates, i.e. the pixels marked 01, surrounded by zeroes, a third interlaced region contains the image pixels with even x and odd y coordinates, i.e. the pixels marked 10, surrounded by zeroes, and a fourth interlaced region contains the image pixels with odd x and odd y coordinates, i.e. the pixels marked 11, surrounded by zeroes.

Within each interlaced region, no two pixels are adjacent by definition; every active pixel is always surrounded by eight zero pixels. In other words, each of these interlaced regions has a pixel spacing of twice a spacing of said pixels in said replay field. As a result, inter-pixel interference is significantly reduced, leading to substantial improvements in output image fidelity.

A subfield image or sub-segment is derived for each interlaced region by disregarding the zero pixels. The subfield images are termed $T^{00}$, $T^{01}$, $T^{10}$, and $T^{11}$, as follows:

$$T_{yx}^{00} = T_{2y,2x} \quad T_{yx}^{01} = T_{2y,2x+1}$$

$$T_{yx}^{10} = T_{2y+1,2x} \quad T_{yx}^{11} = T_{2y+1,2x+1}$$

$T^{00}$ contains the image pixels with even x and even y coordinates $T^{01}$ contains the image pixels with odd x and even y coordinates $T^{10}$ contains the image pixels with even x and odd y coordinates $T^{11}$ contains the image pixels with odd x and odd y coordinates As shown in FIG. 4, $T^{00}$, $T^{01}$, $T^{10}$, and $T^{11}$ are $$\frac{M}{2} \times \frac{M}{2}$$

-pixel sub-segments and thus have a resolution reduced four-fold compared to M×M-pixel image T. For each of these sub-segments, the corresponding $$\frac{M}{2} \times \frac{M}{2}$$

-pixel subfield holograms $H_{00}$, $H_{01}$, $H_{10}$ and $H_{11}$ are then calculated. A variant of the standard ADOSPR algorithm termed SSOSPR (sub-segment OSPR) may be used to calculate the N sub-frames of the subfield holograms (as described in more detail below).

The full (pseudo-replicated) hologram $H'_{00}$, $H'_{01}$, $H'_{10}$ and $H'_{11}$ of each interlaced region is formed by displaying a plurality of substantial replicas of said subfield hologram simultaneously on said SLM. $H'_{00}$, $H'_{01}$, $H'_{10}$ and $H'_{11}$ are defined as follows:

$$H'_{00} = \begin{pmatrix} H_{00} & H_{00} \\ H_{00} & H_{00} \end{pmatrix} \quad H'_{01} = \begin{pmatrix} H_{10} & -H_{10} \\ H_{10} & -H_{10} \end{pmatrix}$$

$$H'_{10} = \begin{pmatrix} H_{01} & H_{01} \\ -H_{01} & -H_{01} \end{pmatrix} \quad H'_{11} = \begin{pmatrix} H_{11} & -H_{11} \\ -H_{11} & H_{11} \end{pmatrix}$$

H'$_{00}$ comprises four replicas of the subfield hologram H$_{00}$ one in each quadrant (or tile) of the hologram. Displaying H'$_{00}$ on the display will render just the image pixels with even x and even y coordinates in the correct locations, with zeroes elsewhere in the reproduction. Similarly, H'$_{01}$ comprises four replicas of the subfield hologram H$_{01}$, one in each quadrant of the hologram with the data inverted for the right-hand quadrants. H'$_{01}$ will render just the image pixels with odd x and even y coordinates, with zeroes elsewhere, and so forth. As a result, if we time-sequence the holograms H'$_{00}$, H'$_{01}$, H'$_{10}$, H'$_{11}$, the entire image is formed through incoherent summation (in the eye) of the four interlaced regions.

Before processing each subfield image, four complex phase shift matrices, along with their complex conjugates, need to be computed. These matrices are fixed and can in principle be pre-stored, or their elements generated on-the-fly as data passes through the FFT engine.

These phase shift matrices are of size $$\frac{M}{2} \times \frac{M}{2}$$

and have elements given below.

$$P_{vu}^{00} = 1 \quad P_{vu}^{01} = e^{\frac{2\pi j u}{M}} \quad \overline{P}_{vu}^{00} = 1 \quad \overline{P}_{vu}^{01} = e^{\frac{-2\pi j u}{M}}$$

$$P_{vu}^{10} = e^{\frac{2\pi j v}{M}} \quad P_{vu}^{11} = e^{\frac{2\pi j(u+v)}{M}} \quad \overline{P}_{vu}^{10} = e^{\frac{-2\pi j v}{M}} \quad \overline{P}_{vu}^{11} = e^{\frac{-2\pi j(u+v)}{M}}$$

where $$0 \le v, u < \frac{M}{2},$$

with v representing the vertical coordinate in hologram space, and u representing the horizontal coordinate.

The phase shift matrices provide lateral displacement in said replay field. For the first sub-field hologram, there is no lateral displacement, for the second sub-field hologram, there is a lateral displacement of one pixel horizontally, for the third sub-field hologram, one pixel vertically, and for the fourth sub-field hologram, one pixel both horizontally and vertically.

Figure 5:
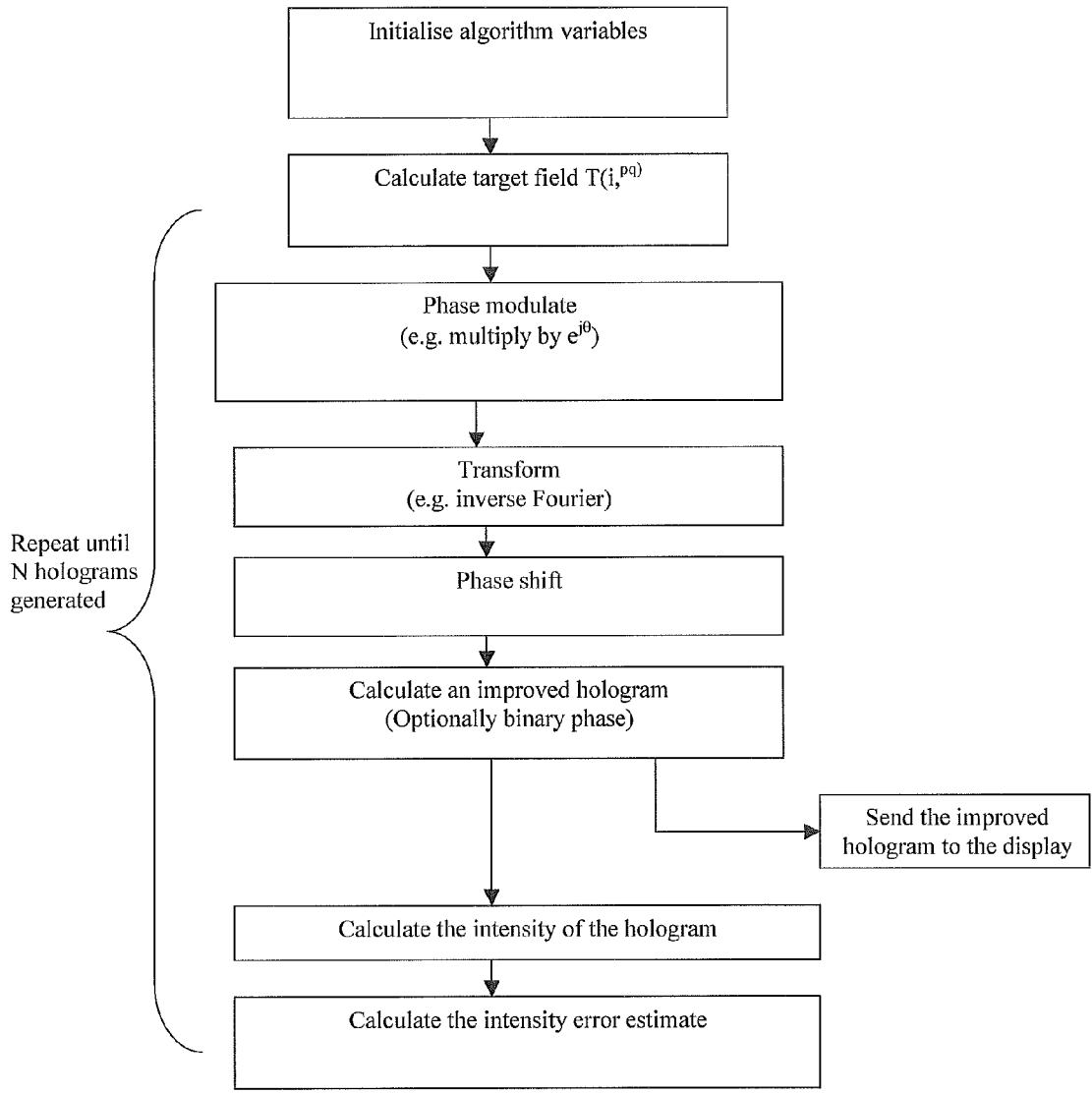
FIG. 5 shows, schematically, a flow diagram of a procedure according to an embodiment of the invention.

Each of the target segments T$^{qp}$ is processed independently by the variation of the OSPR algorithm (SSOSPR) detailed in FIG. 5. The target segments may be processed in parallel or (probably preferably) sequentially.

The algorithm shown in FIG. 5 is executed in its entirety for each segment qp, where qp is 00, 01, 10 or 11. The terms are defined as follows:

The loop variable i represents the current sub-frame number

T$_{yx}^{qp}$ represents the amplitude of the input image for sub-segment qp, at coordinates (x, y)

T$_{yx}^{(i,qp)}$ represents the target image energy of sub-frame i, sub-segment qp E$_{yx}^{qp}$ represents the constantly-updated estimate of the reconstruction field intensity error $\hat{T}_{yx}^{(i,qp)}$ represents the desired target image field, adjusted for the intensity error E present H$_{vu}^{(i,qp)}$ and $\hat{H}_{vu}^{(i,qp)}$ represent non-quantised and quantised holograms respectively, generated by the algorithm P$^{qp}$ represent the phase-shift matrices described above, with $\overline{P}_{qp}$ representing their complex conjugates The loop variable q represents the iteration number of the coherent optimisation loop (Liu-Taghizadeh)

$\psi_{yx}^{(i,qp)}$ represents the fully-complex reconstruction field $\psi'_{yx}^{(i,qp)}$ represents an error-reducing modification to the reconstruction field $\psi_{yx}^{(i,qp)}$ I$_{yx}^{(i,qp)}$ represents the instantaneous intensity of the reconstruction field, as perceived by the eye α and κ represent Fourier transform scaling constants γ$_1$ and γ$_2$ represent fixed algorithm constants, with final values to be determined (currently γ$_1$=2 and γ$_2$=1)

Referring to FIG. 5, the first step of initialising algorithm variables sets:

$$i := 1$$

$$T_{yx}^{(1,qp)} := [T_{yx}^{qp}]^2 \quad 0 \le y, x < \frac{M}{2}$$

$$E_{yx}^{qp} := 0$$

The field error estimate E is initially set to zero and refined in later iterations.

The target field, adjusted for field error E, is calculated as:

$$\hat{T}_{yx}^{(i,qp)} := \begin{cases} \sqrt{T_{yx}^{(i,qp)} - E_{yx}^{qp}} & \text{if } T_{yx}^{(i,qp)} > E_{yx}^{qp} \\ 0 & \text{otherwise} \end{cases}$$

A first approximation to the hologram is generated by phase modulating the target field, i.e. multiplying by $e^{j\Theta}$, then transforming, i.e. by applying an inverse Fourier transform and multiplying pointwise with the appropriate phase-shift matrix P. The steps of phase modulating and transforming are identical to that used in the standard OSPR algorithm. The variation is the introduction of multiplication by phase-shift matrix P.

$$.H_{vu}^{(i,qp)} := P_{vu}^{qp} . F^{-1}[\hat{T}_{yx}^{(i,qp)} . e^{j\phi_{yx}^{(i)}}]$$

As in the standard OSPR algorithm, the fully complex hologram may then optionally quantised to binary phase, as follows:

$$\hat{H}_{vu}^{(i,qp)} := \begin{cases} -1 & \text{Re}(H_{vu}^{(i,qp)}) \le 0 \\ 1 & \text{Re}(H_{vu}^{(1,qp)}) > 0 \end{cases}$$

Although binary phase quantisation is described, multiphase quantisation is an alternative approach, e.g. as shown in FIG. 3b. The first approximation may be refined, e.g. by applying the four steps of the Liu-Taghizadeh algorithm. Other similar sub-algorithms may be used to achieve coherent optimisation.

Step 1 of the Liu-Taghizadeh algorithm is to calculate the FFT of the ith hologram, e.g. by applying the following equations for the binarised hologram:

$$q := 0$$

$$\psi_{yx}^{(i,qp)} := F[\overline{P}_{vu}^{qp} \cdot \hat{H}_{vu}^{(i,qp)}]$$

Step 2 is to update the obtained field with coherent noise compensation in the specified signal window W. Constants are $\gamma_1=2$, $\gamma_2=1$ (subject to change)

$$\kappa := \frac{\sum_{x,y \in W} |\psi_{yx}^{(i,qp)}|}{\sum_{x,y \in W} \sqrt{\hat{T}_{yx}^{(i,qp)}}}$$

$$\psi_{yx}^{\prime(i,qp)} := \begin{cases} \left| \gamma_1 \kappa \sqrt{\hat{T}_{yx}^{(i,qp)}} - \gamma_2 \psi_{yx}^{(i,qp)} \right| \cdot e^{j \angle \psi_{yx}^{(i,qp)}} & (x,y) \in W \\ \text{unchanged} & (x,y) \notin W \end{cases}$$

Step 3 is to calculate a first iteration of an improved hologram which may then be optionally binarised:

$$H_{vu}^{(1,qp)} := P_{vu}^{qp} \cdot F^{-1}[\psi_{yx}^{\prime(i,qp)}]$$

$$\hat{H}_{vu}^{(i,qp)} := \begin{cases} -1 & \text{Re}(H_{vu}^{(i,qp)}) \leq 0 \\ 1 & \text{Re}(H_{vu}^{(1,qp)}) > 0 \end{cases}$$

Step 4 is to complete the next loop of the Liu-Taghizadeh sub-algorithm, feeding each iteration of the improved hologram through, until done Q iterations have been completed, i.e.

$$q = q+1$$

Go to step 1 of the Liu-Taghizadeh algorithm if q<Q

The hologram generated by the final iteration of the Liu-Taghizadeh sub-algorithm is then sent to the display. The Liu-Taghizadeh sub-algorithm is a standard sub-algorithm that may be replaced with equivalent sub-algorithms and is not an essential feature of the present invention. The Liu-Taghizadeh sub-algorithm may be altered in a standard way to generate an improved hologram when the binarisation step is omitted.

Once the Liu-Taghizadeh sub-algorithm is completed, the intensity of the hologram is multiplied by the complex conjugate of the phase-shift matrix and its Fast Fourier transform is calculated. In other words, the transform and phase-shift steps detailed above are reversed.

$$I_{yx}^{(i,qp)} := |F[\overline{P}_{vu}^{qp} \cdot \hat{H}_{vu}^{(i,qp)}]|^2$$

Although the equation above shows the binarised hologram, the equation may be amended in a standard way to calculate the intensity for a hologram which has not been binarised.

The intensity error estimate is calculated to compensate for the noise perceived by the eye at this point as follows:

$$\alpha := \sqrt{\frac{\sum_{x,y} T_{yx}^{(i,qp)} I_{yx}^{(i,qp)}}{\sum_{x,y} [I_{yx}^{(i,qp)}]^2}}$$

$$E_{yx}^{qp} := E_{yx}^{qp} + \alpha I_{yx}^{(i,qp)} - T_{yx}^{(i,qp)}$$

The calculated intensity error is fed into the second step, namely calculate the target field and all the subsequent steps of the algorithm are re-calculated. The algorithm loops until all N holograms have been produced The algorithm is run for each of the 4 sub-segments, generating a total of 4N hologram sub-frames, given by $H_{vu}^{(i,qp)}$. These holograms are then processed (preferably internally in the display) to form the pseudo-replicated holograms $H'_{vi}^{(i,qp)}$ defined above, which are then displayed.

Because the subfield holograms are independent, they can be computed sequentially. As each subfield hologram requires a Fourier transform of size of only $$\frac{M}{2} \times \frac{M}{2},$$

instead of M×M as required in the conventional approach, the memory size required for the transform step is reduced by a factor of four, making on-chip implementation more feasible In practice, in order to achieve acceptable image quality, a number of iterations of coherent optimisation are required (i.e. Q>1), and as such the algorithm described above is too computationally-complex. An alternative solution which is computationally efficient is to use the concept of i-frames and s-frames:

An i-frame (initial frame) represents a new incoming video frame for which holograms are generated from scratch. There is no reliance on previous frames.

An s-frame (subsequent frame) uses the hologram generated for the previous video frame as an initial estimate, from which to generate the hologram for this subsequent frame.

Figure 6:
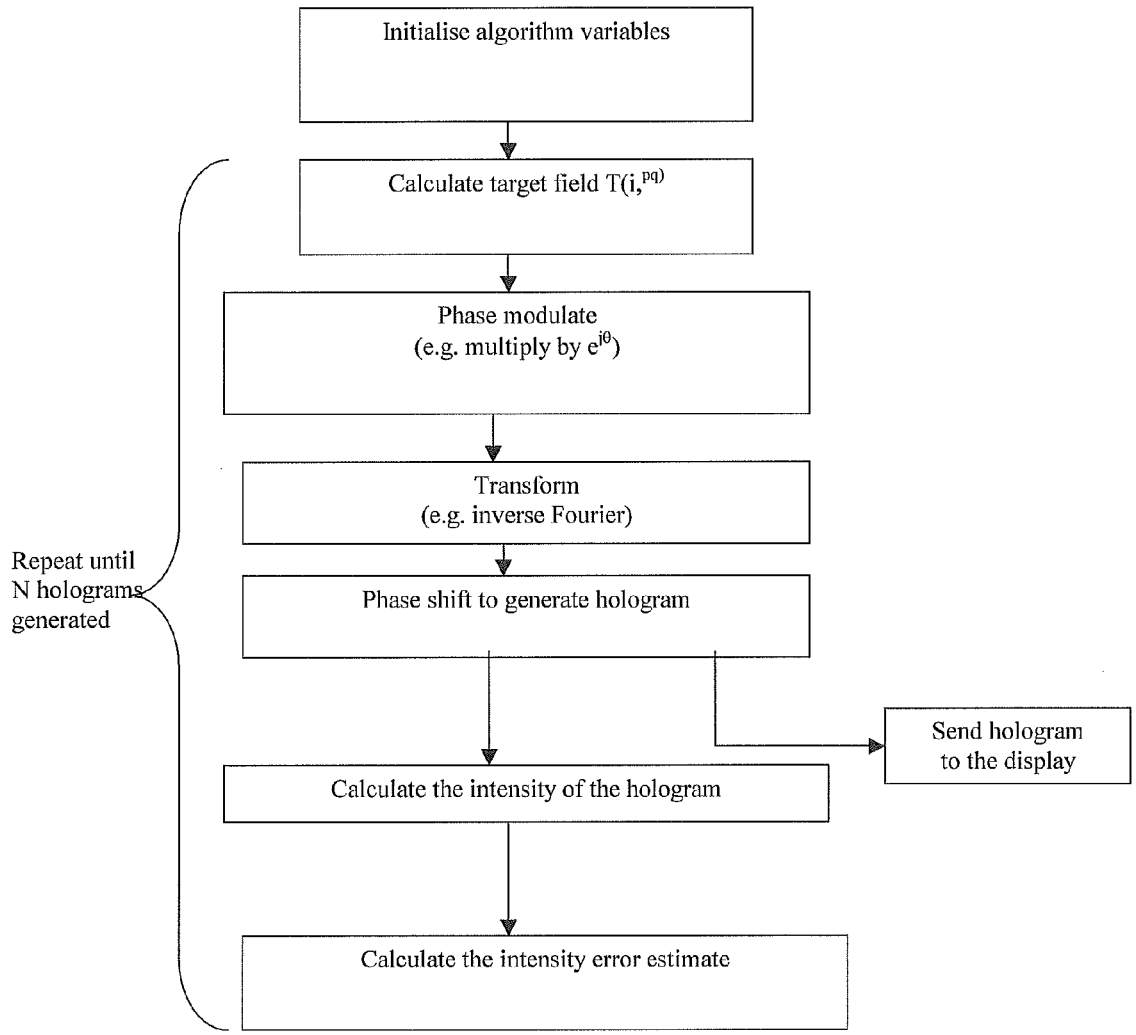
FIGS. 6 and 7 shows flow charts for a variation of the method of FIG. 4 using i-frames and s-frames.

FIG. 6 shows the flow-chart for the sub-segment algorithm for an i-frame. The steps of the algorithm are identical to those shown in FIG. 5 except for the omission of the Liu-Taghizadeh sub-algorithm.

In other words, the first step is the initialisation of the variables:

$$i := 1$$

$$T_{yx}^{(1,qp)} := [T_{yx}^{qp}]^2 \quad 0 \leq y, x < \frac{M}{2}$$

$$E_{yx}^{qp} := 0$$

The second step is to calculated the target field adjusted for field error E as:

$$\hat{T}_{yx}^{(i,qp)} := \begin{cases} \sqrt{T_{yx}^{(i,qp)} - E_{yx}^{qp}} & \text{if } T_{yx}^{(i,qp)} > E_{yx}^{qp} \\ 0 & \text{otherwise} \end{cases}$$

A fully complex hologram is generated by applying:

$$H_{vu}^{(i,qp)} := P_{vu}^{qp} \cdot F^{-1}[\hat{T}_{yx}^{(i,qp)} \cdot e^{j\phi_{yx}^{(i)}}]$$

The hologram may then optionally be quantised to binary phase, as a first approximation to an optimised hologram:

$$\hat{H}_{vu}^{(i,qp)} := \begin{cases} -1 & \text{Re}(H_{vu}^{(i,qp)}) \leq 0 \\ 1 & \text{Re}(H_{vu}^{(1,qp)}) > 0 \end{cases}$$

The intensity of the FFT of the ith hologram is then calculated, e.g. by applying the following equation for the binarised hologram:

$$I_{yx}^{(i,qp)} := |F[\overline{P}_{vu}^{qp} \cdot \hat{H}_{vu}^{(i,qp)}]|^2$$

The next step is to calculate the intensity error estimate to compensate for the noise perceived by the eye at this point $$\alpha := \sqrt{\frac{\sum_{x,y} T_{yx}^{(i,qp)} I_{yx}^{(i,qp)}}{\sum_{x,y} [I_{yx}^{(i,qp)}]^2}}$$

$$E_{yx}^{qp} := E_{yx}^{qp} + \alpha I_{yx}^{(i,qp)} - T_{yx}^{(i,qp)}$$

The next loop of the algorithm is completed until all N holograms have been produced, i.e.

$$i := i+1$$

Go to step 2 if i<N

Figure 7:
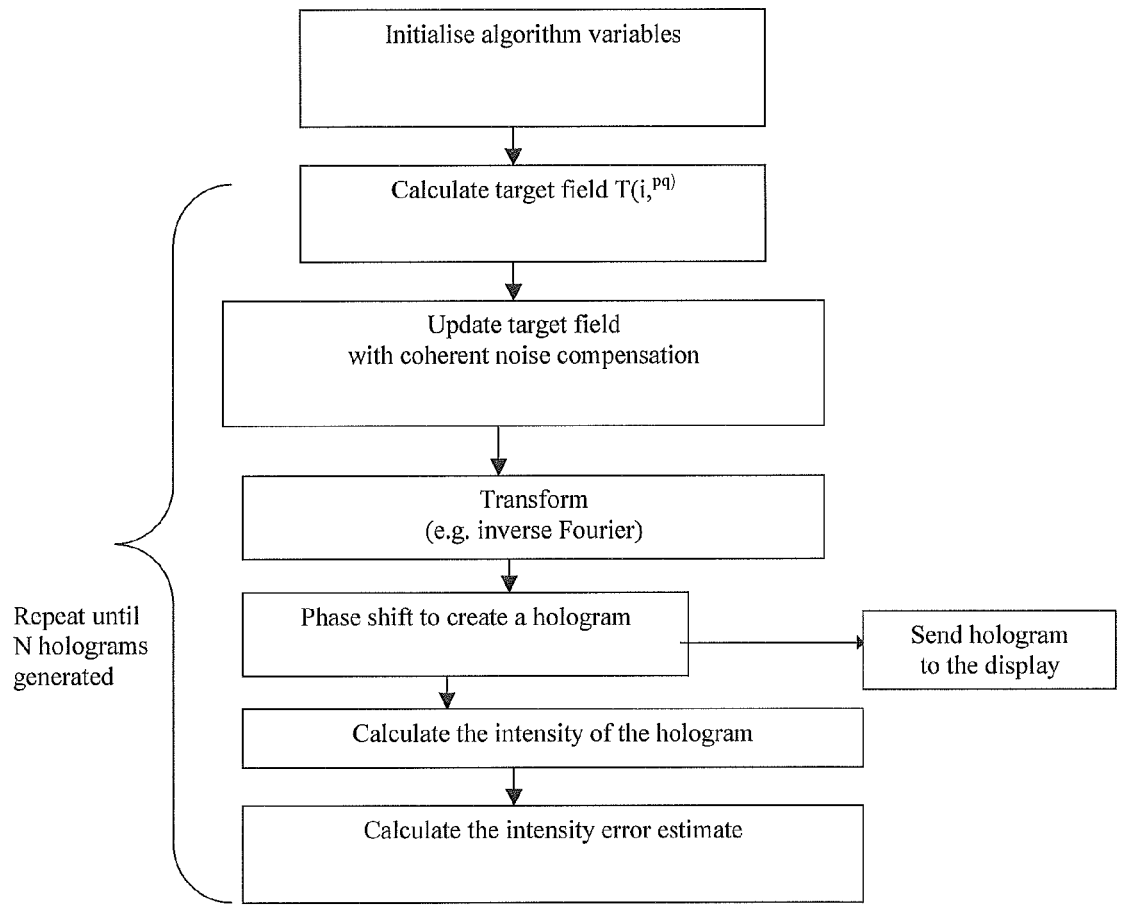

FIG. 7 shows the sub-segment algorithm for an s-frame. The steps of the algorithm are identical to those shown in FIG. 6 except at steps 3 and 4.

In other words, the first step is the initialisation of the variables:

$$i := 1$$

$$T_{yx}^{(1,qp)} := [T_{yx}^{qp}]^2 \quad 0 \leq y, x < \frac{M}{2}$$

$$E_{yx}^{qp} := 0$$

Then the target field adjusted for field error E is calculated as:

$$\hat{T}_{yx}^{(i,qp)} := \begin{cases} \sqrt{T_{yx}^{(i,qp)} - E_{yx}^{qp}} & \text{if } T_{yx}^{(i,qp)} > E_{yx}^{qp} \\ 0 & \text{otherwise} \end{cases}$$

At step 3, instead of calculating a fully complex hologram, the target field is updated with coherent noise compensation in the specified signal window W, based on the previous video frame. Constants are $\gamma_1=2$, $\gamma_2=1$ (subject to change)

$$\kappa := \frac{\sum_{x,y \in W} |\psi_{yx}^{(i-1,qp)}|}{\sum_{x,y \in W} \sqrt{\hat{T}_{yx}^{(i,qp)}}}$$

$$\psi_{yx}'^{(i,qp)} := \begin{cases} \left| \gamma_1 \kappa \sqrt{\hat{T}_{yx}^{(i,qp)}} - \gamma_2 \psi_{yx}^{(i-1,qp)} \right| \cdot e^{j \angle \psi_{yx}^{(i-1,qp)}} & (x,y) \in W \\ \psi_{yx}^{(i-1,qp)} & (x,y) \notin W \end{cases}$$

An improved hologram is then calculated and may optionally be quantised to give:

$$H_{vu}^{(i,qp)} := P_{vu}^{qp} \cdot F^{-1}[\psi_{yx}'^{(i,qp)}]$$

$$\hat{H}_{vu}^{(i,qp)} := \begin{cases} -1 & \text{Re}(H_{vu}^{(i,qp)}) \leq 0 \\ 1 & \text{Re}(H_{vu}^{(i,qp)}) > 0 \end{cases}$$

The next step is to calculate the intensity of the FFT of the ith hologram, e.g. using the following equation for the binarised hologram:

$$I_{yx}^{(i,qp)} := |F[\overline{P}_{vu}^{qp} \cdot \hat{H}_{vu}^{(i,qp)}]|^2$$

The intensity error estimate is then calculated to compensate for the noise perceived by the eye at this point $$\alpha := \sqrt{\frac{\sum_{x,y} T_{yx}^{(i,qp)} I_{yx}^{(i,qp)}}{\sum_{x,y} [I_{yx}^{(i,qp)}]^2}}$$

$$E_{yx}^{qp} := E_{yx}^{qp} + \alpha I_{yx}^{(i,qp)} - T_{yx}^{(i,qp)}$$

Finally, the next loop of the algorithm is completed until all N holograms have been produced $$i := i+1$$

Go to step 2 if i<N

If subsequent video frames are similar in content, as they frequently are, this approach enables coherent hologram optimisation to proceed from one video frame to the next, as well as incoherent hologram optimisation to proceed from one sub-frame to the next. As a result, only one "iteration" of Liu-Taghizadeh need be performed for each video frame, with an associated reduction in the computation required.

Figure 8:
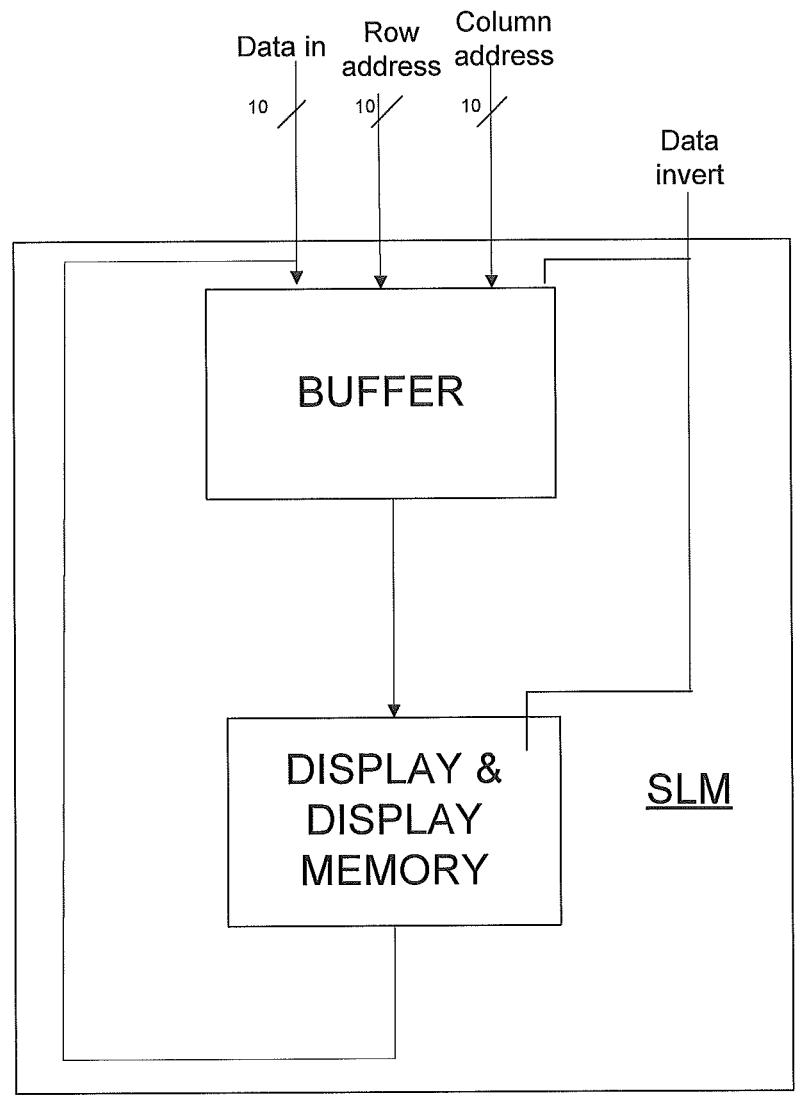
FIG. 8 shows a schematic of an SLM configured to reconstruct a hologram from a plurality of sub-field holograms.

As explained above, subfield holograms of size $$\frac{M}{2} \times \frac{M}{2}$$

are calculated and a full (pseudo-replicated) hologram is formed from substantial replicas of these subfield holograms. To avoid increasing the bandwidth of the transmission from the calculation system to the SLM, the subfield holograms are sent to the SLM which is configured to determine the full hologram. FIG. 8 shows a schematic implementation of such an SLM. Data is fed into a buffer together with row and column address. As shown, data is wrapped around from the display memory when loading. For the 1024×1024 pixel hologram described above, the data and addresses are 10 bit addresses. The tenth bit of each address is tied to the quadrant (or tile) to which the hologram subfield is to be addressed. The tenth bit is also tied to an invert pin which is adjustable to give normal or inverted data in each quadrant according to the definitions of $H'_{00}$, $H'_{01}$, $H'_{10}$, $H'_{11}$ given above.

Applications for the described techniques and modulators include, but are not limited to the following: mobile phone; PDA; laptop; digital camera; digital video camera; games console; in-car cinema; navigation systems (in-car or personal e.g. wristwatch GPS); head-up and helmet-mounted displays for automobiles and aviation; watch; personal media player (e.g. MP3 player, personal video player); dashboard mounted display; laser light show box; personal video projector (a "video iPod®" concept); advertising and signage systems; computer (including desktop); remote control unit; an architectural fixture incorporating a holographic image display system; more generally any device where it is desirable to share pictures and/or for more than one person at once to view an image.

No doubt many effective alternatives will occur to the skilled person and it will be understood that the invention is not limited to the described embodiments and encompasses modifications apparent to those skilled in the art lying within the spirit and scope of the claims appended hereto.

What is claimed is:

1. A method of displaying an image holographically, the method comprising
    displaying a hologram on pixels of a spatial light modulator (SLM) and
    illuminating said SLM such that said image is displayed in pixels of a display surface on which said hologram is displayed, and
    wherein the method further comprises
    subdividing said display surface into a plurality of spatially interlaced regions,
    displaying holograms for each of said interlaced regions of said display surface sequentially at different times such that in an observer's eye said interlaced regions integrate to give the impression of said image and such that interference between adjacent pixels of said display surface is reduced, and
    calculating a hologram to display a said interlaced region of said display surface by calculating an input hologram to display pixels in said display surface at a reduced resolution and wherein said hologram displaying comprises displaying a plurality of substantial replicas of said input hologram simultaneously on said SLM.

2. A method as claimed in claim 1 wherein a said interlaced region comprises a set of pixels of said display surface in which each pixel is surrounded by pixels of substantially zero light intensity.

3. A method as claimed in claim 1 or 2 wherein a said interlaced region comprises a set of pixels arranged in a regular grid having spaces in between, said grids of different said interlaced regions being spatially displaced with respect to one another such that pixels of one said grid are located in said spaces of another said grid.

4. A method as claimed in claim 1 wherein said reduced resolution is reduced in proportion to a number of said spatially interlaced regions employed.

5. A method as claimed in claim 1 wherein four said interlaced regions are employed each having a pixel spacing of twice a spacing of said pixels in said display surface.

6. A method as claimed in claim 5 wherein holograms for said interlaced regions are displayed on said SLM with, respectively, phases to provide lateral displacement in said display surface of: substantially zero pixels, one pixel horizontally, one pixel vertically, and one pixel both horizontally and vertically.

7. A method as claimed in claim 6 wherein said calculating of a said hologram comprises applying phase shift to provide said lateral displacement.

8. A method according to claim 1, comprising calculating a set of hologram temporal sub-frames for each spatially interlaced region.

9. A non-transitory computer-readable medium comprising computer program and processor control code to, when running, implement the method of claim 1.

10. A method of displaying an image holographically, the method comprising
    displaying a hologram on pixels of a spatial light modulator (SLM) and
    illuminating said SLM such that said image is displayed in pixels of a display surface on which said hologram is displayed, and
    wherein the method further comprises
    subdividing said display surface into a plurality of spatially interlaced regions, and
    displaying holograms for each of said interlaced regions of said display surface sequentially at different times such that in an observer's eye said interlaced regions integrate to give the impression of said image and such that interference between adjacent pixels of said display surface is reduced,
    wherein four said interlaced regions are employed each having a pixel spacing of twice a spacing of said pixels in said display surface, and
    wherein holograms for said interlaced regions are displayed on said SLM with, respectively, phases to provide lateral displacement in said display surface of substantially zero pixels, one pixel horizontally, one pixel vertically, and one pixel both horizontally and vertically.

11. A method as claimed in claim 10 wherein a said interlaced region comprises a set of pixels of said display surface in which each pixel is surrounded by pixels of substantially zero light intensity.

12. A method as claimed in claim 10 wherein a said interlaced region comprises a set of pixels arranged in a regular grid having spaces in between, said grids of different said interlaced regions being spatially displaced with respect to one another such that pixels of one said grid are located in said spaces of another said grid.

13. A method as claimed in claim 10, further comprising calculating a hologram to display a said interlaced region of said display surface by calculating an input hologram to display pixels in said display surface at a reduced resolution and wherein said hologram displaying comprises displaying a plurality of substantial replicas of said input hologram simultaneously on said SLM, wherein said reduced resolution is reduced in proportion to a number of said spatially interlaced regions employed.

14. A method as claimed in claim 10 wherein said calculating of a said hologram comprises applying phase shift to provide said lateral displacement.

15. A method according to claim 10, comprising calculating a set of hologram temporal sub-frames for each spatially interlaced region.

16. A non-transitory computer-readable medium comprising computer program and processor control code to, when running, implement the method of claim 10.

* * * * *